Patented Apr. 4, 1944

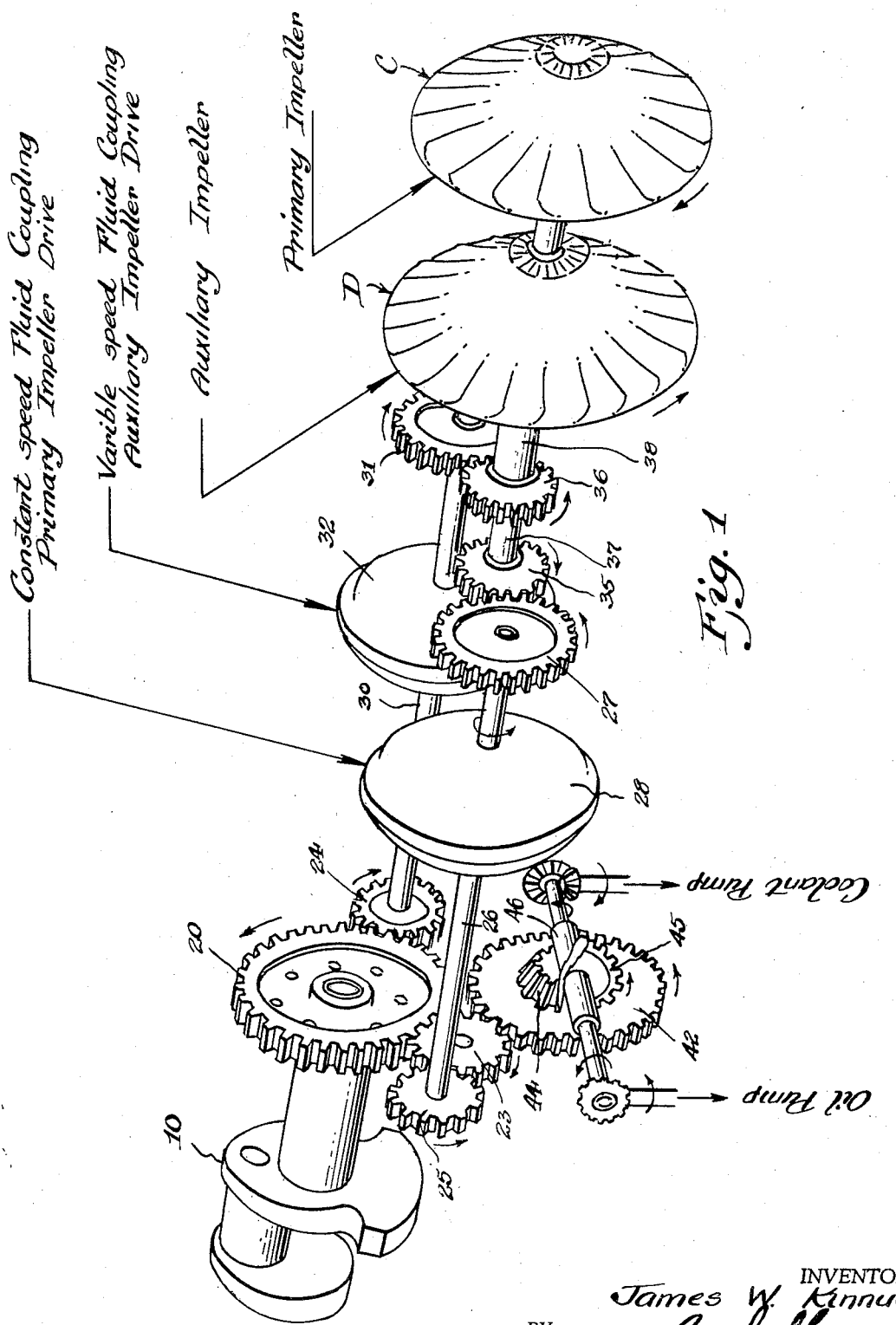

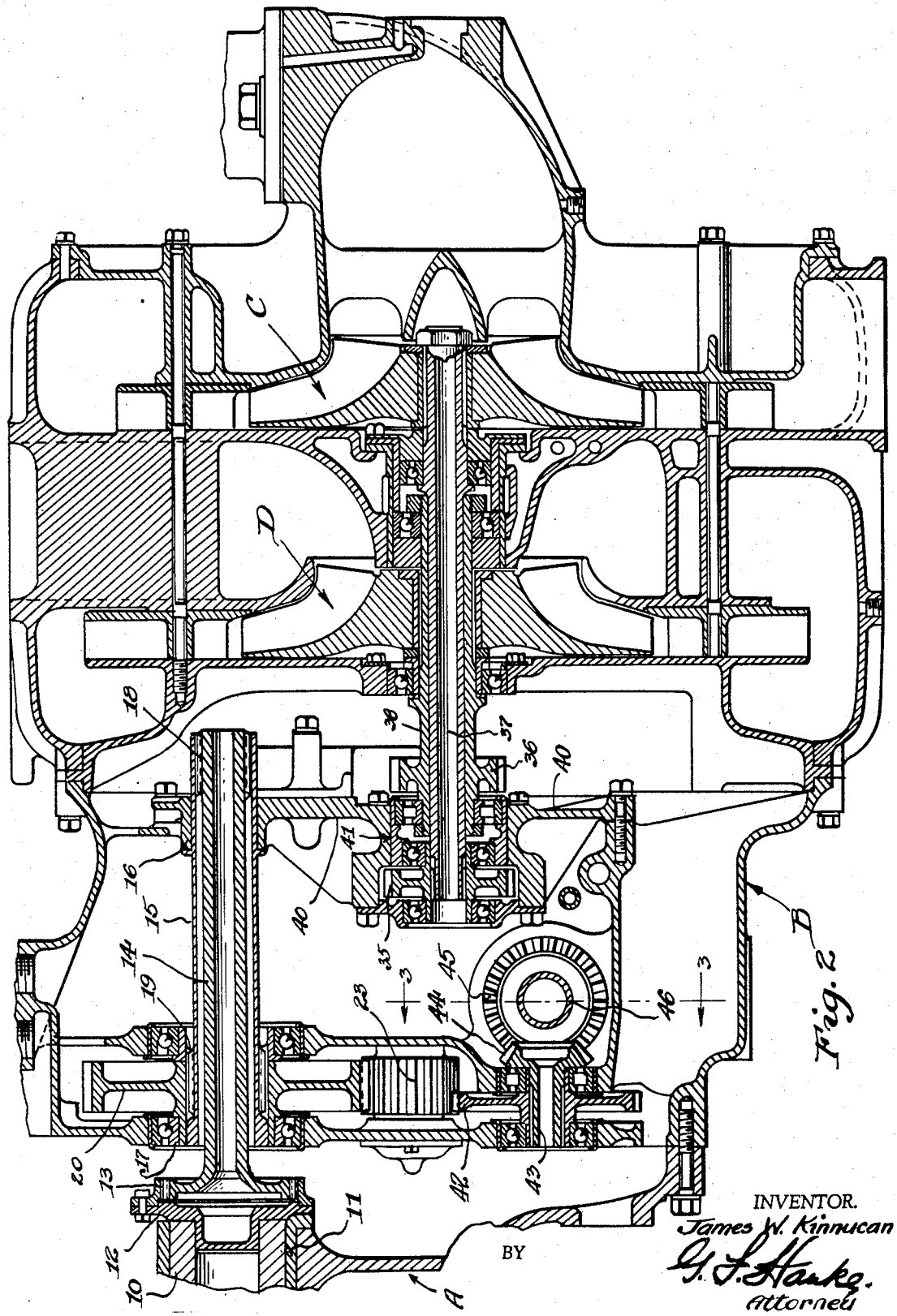

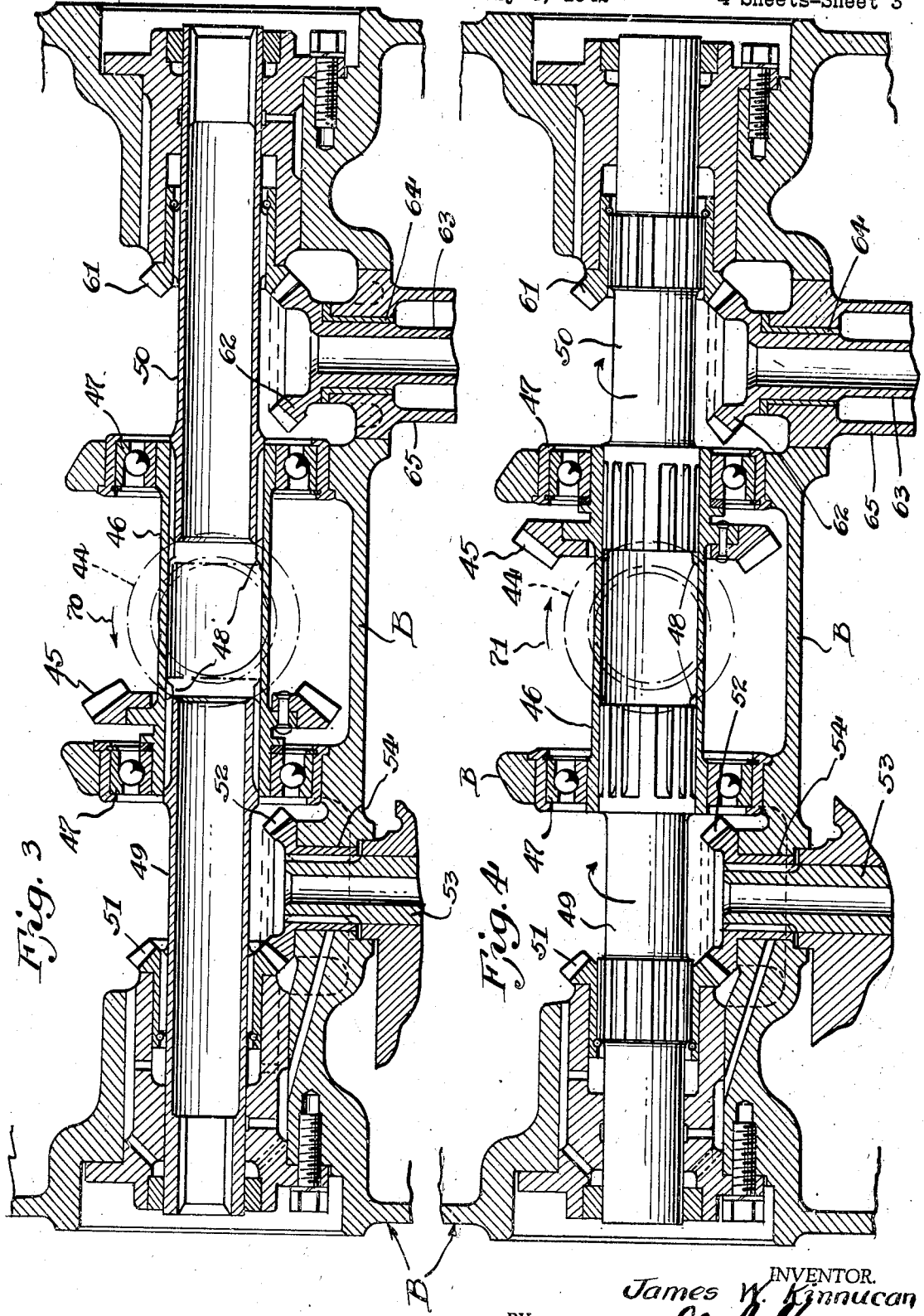

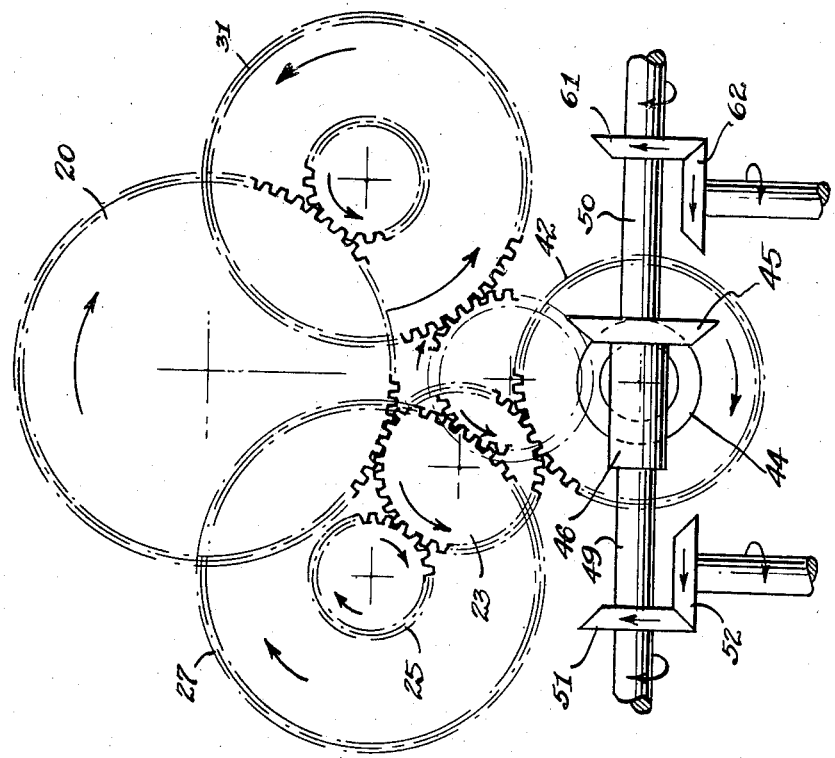
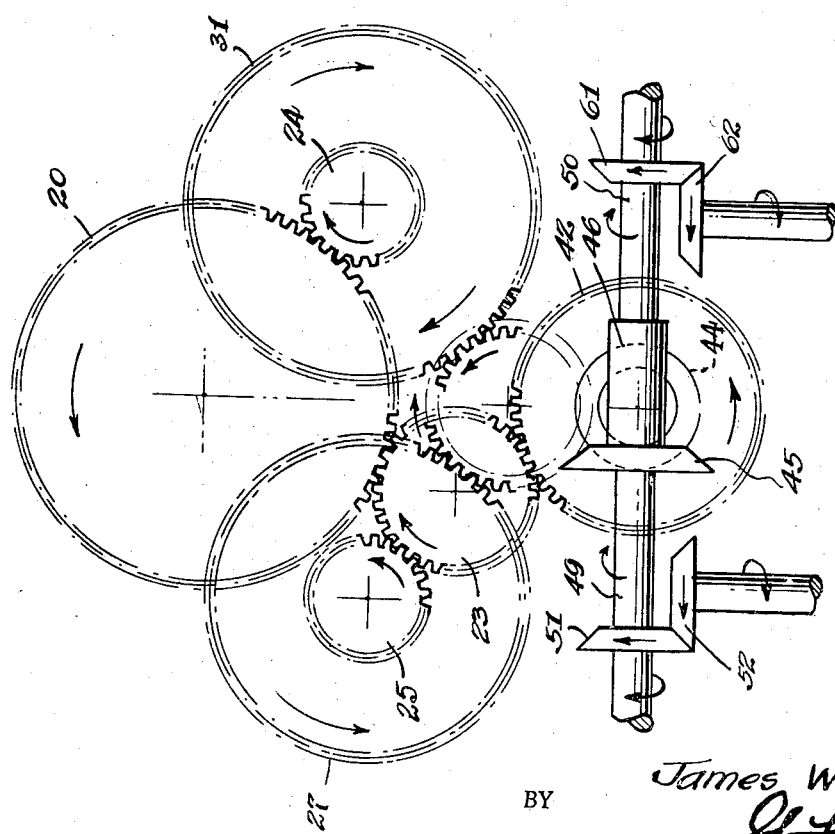

2,346,032

UNITED STATES PATENT OFFICE 2,346,032

REVERSING ACCESSORY DRIVE ASSEMBLY

James W. Kinnucan, Detroit, Mich., assignor to Continental Aviation & Engineering Corporation, Detroit, Mich., a corporation of Virginia Application July 4, 1942, Serial No. 449,762

3 Claims. (Cl. 74—389)

My invention relates to an aircraft internal combustion engine and more particularly to an accessory drive assembly, including means constructed and arranged for operatively connecting an engine driving gear with certain engine accessories, and more particularly including reversible means having driving connections which are interchangeable with the accessory driving means.

In aircraft engines, it is very essential to maintain engine weight characteristics at a minimum and to construct same so as to permit an interchange of parts, thus requiring that only a minimum number of parts be carried for servicing and assembling the accessory drive assembly for either a right hand or left hand engine.

An object of my present invention is to construct an improved engine accessory drive assembly by providing an improved accessory drive assembly adapted for operative assembly with either a right or left hand engine with a minimum of labor and expense, thereby facilitating the manufacturing assembly and servicing of such engines.

Further objects of my present invention are to construct an improved compact accessory drive assembly for assembly with an aircraft engine, by providing a compact reversible mechanism that may be economically manufactured, and which embodies a minimum of parts, and by preferably constructing said accessory parts so as to permit the use of identical parts for either a right hand or left hand drive engine.

For a more detailed understanding of my invention reference may be had to the accompanying drawings illustrating a preferred embodiment of my invention, in which like reference characters refer to like parts throughout the several views, and in which:

Fig. 1 is a diagrammatic perspective view of my improved accessory drive assembly, Fig. 2 is a vertical sectional view thereof, Fig. 3 is a sectional view taken on the line 3—3 of Fig. 2, Fig. 4 is a similar sectional view showing a reversed drive, Fig. 5 is a diagrammatic view illustrating the drive as shown in detail in Fig. 3, and Fig. 6 is a diagrammatic view illustrating the drive as shown in detail in Fig. 4.

Referring more particularly to Figs. 1 and 2 of the drawings, it will be observed that the engine A is provided with a crankshaft 10, one end of which is supported in a bearing 11. The end of the crankshaft carries a flange portion 12, to which is secured a coupling member that is adapted to be splined or otherwise secured, as at 13, to a stub shaft or quill 14. A hollow shaft or second quill 15 is telescoped longitudinally relatively of the quill 14 and is supported in spaced bearings 16 and 17, said quills being splined together as at 18. The second quill or outer quill 13 is keyed or splined as at 19 to a crankshaft driving gear 20.

The supercharger assembly includes a housing B preferably constructed of a plurality of casings bolted or otherwise secured together and housing a primary impeller C and an auxiliary impeller D.

Separate impeller driving means are provided for drivingly connecting these impellers to the crankshaft driving gear 20. Referring more particularly to Fig. 1, these impeller driving means may be seen as a whole, and same comprise a pair of gears 23 and 24 respectively associated with the primary and auxiliary impeller drives. The gear 23 meshes with gear 25 which is splined to the lay shaft 26 and drives the primary impeller driving gear 27 by means of a fluid coupling 28. This fluid coupling is constructed to have a minimum slip, and is preferably constructed to have a slip which will not approximately exceed three per cent, so that the gear 27 is thus driven by the engine at substantially a constant speed. The gear 24 is keyed or splined to shaft 30 which drives the auxiliary impeller driving gear 31 through a fluid coupling 32. This fluid coupling 32 is constructed with a large slip preferably approximately 50% so that the gear 31 may be driven at variable speeds, the speed of said gear being controlled by the action of the coupling, by means of devices which control the flow of fluid into the coupling.

Gear 27 meshes with gear 35 while the gear 31 meshes with gear 36. The gear 35 is splined to the primary impeller shaft 37 while the gear 36 is preferably formed as a part of the auxiliary impeller shaft 38. The supercharger housing B is preferably provided with a partition 40 carrying suitable bearing means 41 which supports the gears 35 and 36 and the impeller drive shafts.

It is preferable to drive the accessory drive gear 42 from the gear 23, this gear 42 being keyed or splined to a lay-shaft 43 which carries a beveled gear 44, this beveled gear 44 meshing in turn with another beveled gear 45 secured to the accessory drive shaft 46.

As illustrated in Figs. 3 to 6, inclusive, the accessory drive shaft 46 consists of a sleeve which carries or has otherwise secured thereto, the beveled gear 45 and is provided with end portions of like diameter which fit into bearings 47 carried by the accessory housing B. The end portions of this sleeve 46 are both internally splined, as at 48, to receive the externally splined tubular shaft extensions 49 and 50. The shaft extension 49 is splined to a bevelled gear 51, which meshes with a bevelled gear 52, that is in turn splined or otherwise secured to an accessory shaft 53. The shaft extension 50 is splined to a bevelled gear 61 which meshes with a bevelled gear 62 secured to or carried by the accessory shaft 63.

The bevelled gear 52 is splined to the accessory shaft 53, and is carried in a bearing 54 of the accessory housing B whereas the other accessory shaft 63 is preferably supported by a bearing 64 carried by a subhousing 65 which is secured or otherwise suitably carried by the accessory housing B.

It will be noted that the position of the accessory drive sleeve in Fig. 4 is reversed with respect to the position shown in Fig. 3. In this position, however, the drive sleeve bearing portions still fit in the bearings 47 as before, since these bearings are identical in size, and the bearing portions of the sleeve 46 are also of the same dimensions. The internal splines 48 of said accessory drive sleeves 46 are identical, and they fit the external splines carried by either of the shaft extensions 49 and 50. The arrow 70 in Fig. 3 indicates the direction of rotation of the bevelled gear 44 and corresponds to the diagrammatic showing of Fig. 5 in which the crankshaft drive gear 20 rotates in a counter-clockwise direction. In Fig. 4 the arrow 71 indicates a clockwise rotation of the bevelled gear 44 and corresponds with the showing of Fig. 6 in which the crankshaft drive gear 20 is rotated in a clockwise direction.

It will thus be seen that for a clock-wise rotation of the beveled driving gear 44 the accessory drive sleeve 46 is thus reversed relative to the position shown in Fig. 3, and thus the accessory drive shaft extensions 49 and 50 are still rotated in the same direction.

It will be noted that for a right or left hand drive engine, that is, an engine in which the crankshaft is respectively rotated in a counter-clockwise or clockwise direction, the accessory driving means remain the same, it being only necessary to turn the accessory drive sleeve 46 end for end to accommodate for either type of engine drive. Both types of engine drive utilize the same accessory driving mechanism and thus only a minimum number of parts need be carried to service or assemble the accessory driving mechanism. A reverse drive for these accessories is had by merely turning this accessory drive shaft 46 and beveled gear carried thereby end for end and the same may be operatively assembled with the accessory drive mechanism in either of the positions shown in Figs. 3 and 4.

Although I have illustrated but one form of my invention and have described in detail but a single application thereof, it will be apparent to those skilled in the art to which my invention pertains, that various modifications and changes may be made therein without departing from the spirit of my invention or from the scope of the appended claims.

I claim:

1. A reversible accessory gear driving mechanism comprising a lay shaft assembly including an intermediate shaft portion and separate shaft extensions coaxially arranged and drivingly connected with said intermediate shaft portion, means carried by said intermediate shaft portion drivingly connecting same with an engine drive element, and accessory driving gears carried by said shaft extension, said intermediate shaft portion reversible end for end and operable for drivingly connecting same with an engine drive element having an opposite rotation to drive said shaft extensions in the same direction of rotation as before, a support for said lay shaft assembly and including a pair of axially spaced bearings, said intermediate shaft portion provided with end bearing portions interchangeably fitting the spaced bearings carried by said support and having means engaged with either of said bearings to locate said intermediate shaft portion in operating engagement with respect to said engine drive element.

2. A reversible accessory gear driving mechanism comprising a composite lay shaft assembly consisting of an intermediate sleeve internally splined at each end, and separate oppositely extending accessory driving sleeves splined to the end splines of said intermediate sleeve, a support for said lay shaft assembly and comprising spaced bearings, said intermediate sleeve having like external bearing portions at each end supported in said bearings and having secured thereon a beveled gear arranged for driving connection with an engine drive element operable about an axis intersecting with and extending normal to the axis of the lay shaft assembly, said intermediate sleeve being adjustable end for end in said bearings and positioning said beveled gear carried thereby diametrically opposite relative to the engine drive element for operative driving connection with an engine drive element of reverse rotation, the internal splines at each end of said intermediate sleeve interchangeably connected with the external splines of said accessory driving sleeves, and an annular flange carried by said intermediate sleeve and abutted against either bearing carried by said support to position the intermediate sleeve and to locate the beveled gear carried thereby in operative engagement with said engine drive element.

3. A reversible accessory gear driving mechanism comprising a composite lay shaft assembly consisting of an intermediate sleeve internally splined at each end, and separate oppositely extending accessory driving sleeves splined to the end splines of said intermediate sleeve, a support for said lay shaft assembly and comprising spaced bearings, said intermediate sleeve having substantially identical external bearing portions at each end supported in said bearings and having secured thereon a beveled gear arranged for driving connection with an engine drive element operable about an axis intersecting with and extending normal to the axis of the lay shaft assembly, said intermediate sleeve being adjustable end for end in said bearings and positioning said beveled gear carried thereby diametrically opposite relative to the engine drive element for operative driving connection with an engine drive element of reverse rotation, the internal splines at each end of said intermediate sleeve interchangeably connected with the external splines of said accessory driving sleeves, said accessory driving sleeves constructed and arranged identical and interchangeable one with the other, said accessory driving elements all substantially symmetrically supported relative to said intermediate sleeve, and an annular flange carried by the intermediate sleeve and located between the beveled gear and the adjacent bearing portion, said flange arranged to abut either of the bearings carried by the support for locating the beveled gear carried by said intermediate sleeve in operating engagement with said engine drive element.

JAMES W. KINNUCAN.